United States Patent [19]
Spindler-von Dreyse et al.

[11] Patent Number: 6,007,087
[45] Date of Patent: Dec. 28, 1999

[54] VEHICLE STEERING WHEEL WITH AIRBAG MODULE

[75] Inventors: Joerg Spindler-von Dreyse, Freising; Klaus Kompass, Waldkraiburg, both of Germany

[73] Assignee: Bayerische Motoren Werke Aktiengesellschaft, Munich, Germany

[21] Appl. No.: 08/994,753

[22] Filed: Dec. 19, 1997

[30] Foreign Application Priority Data

Dec. 19, 1996 [DE] Germany .............................. 196 53 147

[51] Int. Cl.⁶ .................................................. B60R 21/16
[52] U.S. Cl. ........................................ 280/728.2; 280/731
[58] Field of Search .............................. 280/728.1, 728.2, 280/731, 732

[56] References Cited

U.S. PATENT DOCUMENTS

| | | | |
|---|---|---|---|
| 5,333,897 | 8/1994 | Landis et al. ............................ | 280/728 |
| 5,487,559 | 1/1996 | Headley .................................. | 280/735 |
| 5,533,746 | 7/1996 | Whited .................................. | 280/728.2 |
| 5,676,396 | 10/1997 | Föhl ....................................... | 280/731 |
| 5,720,494 | 2/1998 | Hosoi et al. ............................. | 280/731 |
| 5,738,370 | 4/1998 | Hosoi et al. ............................. | 280/731 |
| 5,765,865 | 6/1998 | Nagata et al. ........................... | 280/731 |
| 5,806,377 | 9/1998 | Noda et al. ............................. | 280/731 |

FOREIGN PATENT DOCUMENTS

| | | |
|---|---|---|
| 0 781 688 | 7/1997 | European Pat. Off. . |
| 0 798 171 | 10/1997 | European Pat. Off. . |
| 44 23 963 | 1/1996 | Germany . |

*Primary Examiner*—J. J. Swann
*Assistant Examiner*—Andrew J. Fischer
*Attorney, Agent, or Firm*—Evenson, McKeown, Edwards & Lenahan, PLLC

[57] ABSTRACT

A vehicle steering wheel to be fitted with an airbag module, with a steering wheel body that is at least partially covered with plastic foam, the body being designed to receive an airbag module. The side of the steering wheel body that faces a vehicle occupant is a permanent part of its plastic foam covering. In addition the steering wheel body can be fastened to a steering shaft by a hub part. On its circumferential surface, the steering wheel body has an opening through which the airbag module can be inserted.

4 Claims, 1 Drawing Sheet

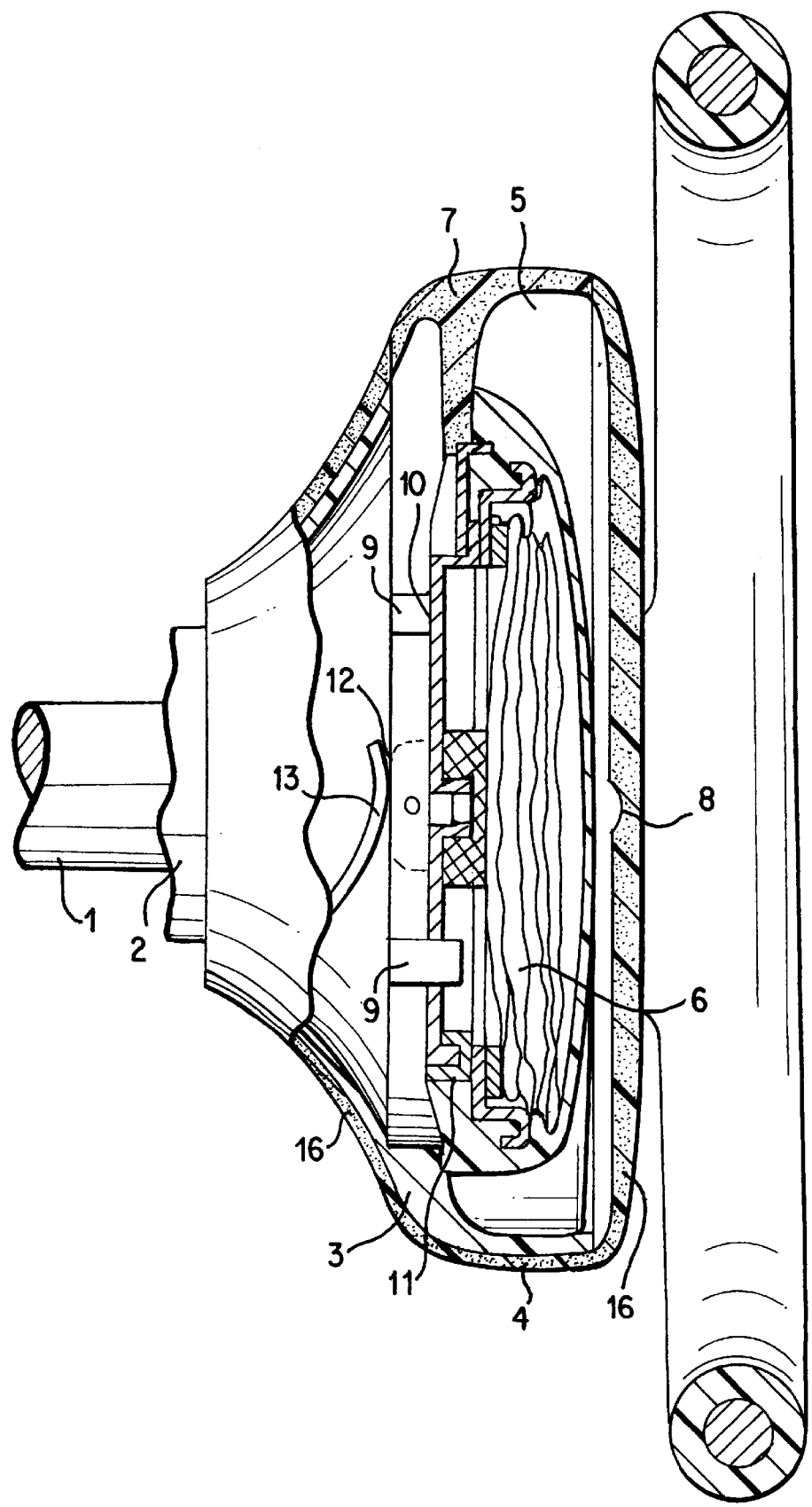

VEHICLE STEERING WHEEL WITH AIRBAG MODULE

This application claims the priority of 196 53 147.0, the disclosure of which is expressly incorporated by reference herein.

BACKGROUND AND SUMMARY OF THE INVENTION

The invention relates to a vehicle steering wheel with an airbag module.

It is already known to provide vehicle steering wheels with airbag modules to reduce the acceleration of a vehicle occupant, the driver, slowly in an accident. The term "airbag module" is used here for a module that consists of at least an airbag and a gas generator. These two devices can be located in a container with a lid, for example. Previously such airbag modules were bolted from the front onto the steering wheel after the steering wheel was installed. On the steering wheel itself, there is a releasable cover that is blown off by the airbag when it inflates.

A visible parting line is then provided between the steering wheel and the cover. Under certain conditions this can have a disadvantageous influence on the steering wheel design. It is also disadvantageous that the airbag module must be connected with the steering wheel in an awkward fashion. This is usually accomplished by bolting it from the rear, which is difficult to do.

German Patent document DE 44 23 963 A1 describes a vehicle steering wheel to be equipped with an integrated gas bag restraint system in which there is no cover. The airbag module, here referred to as a gas bag restraint system, is installed in a steering wheel body covered with plastic foam from the rear, i.e. the side of the steering wheel body that faces the steering shaft. The steering wheel body is connected with the airbag module and the module in turn is connected with the steering shaft. Thus the cover can be designed as a solid component of the plastic foam covering of the steering wheel body, since it is not necessary to install the airbag module from the front, i.e. the side facing the vehicle occupant.

A vehicle steering wheel of this kind has the disadvantage that the airbag module is involved as an integral component when the vehicle steering wheel is removed. The vehicle steering wheel cannot be removed without removing the airbag module. In addition, the vehicle steering wheel must always be mounted together with the airbag module or after the airbag module has been installed in the vehicle, which requires increased caution during installation of the vehicle steering wheel because of the explosive charge contained in the airbag module. In addition, when the airbag module is replaced, the vehicle steering wheel must always be removed as well.

Hence a goal of the invention is to provide a vehicle steering wheel that can be installed with or without an airbag device and in which the steering wheel design is not influenced by the airbag device. Moreover, the airbag device is intended to be easily replaceable without removing the steering wheel and steering wheel removal is intended to be independent of the removal of the airbag device.

This and other goals have been achieved according to the invention by providing a vehicle steering wheel to be equipped with an airbag module, comprising: a steering wheel body that is at least partially covered with plastic foam, said body being designed to accept said airbag module, with a side of steering wheel body that essentially faces a vehicle occupant in an installed position being a permanent part of said plastic foam covering, said steering wheel body being fastenable via a hub part to a steering shaft, said steering wheel body having an opening on a circumferential surface through which said airbag module can be inserted.

This and other goals have also been achieved according to the invention by providing a vehicle steering wheel body, comprising: a covering surface to be essentially faced to a vehicle occupant in an installed position; and a lateral circumferential surface extending from said covering surface such that an interior space is defined by said covering surface and said lateral circumferential surface, said lateral circumferential surface defining an opening through which an airbag module is insertable into said interior space.

This and other goals have also been achieved according to the invention by providing a vehicle steering wheel equipped with an airbag module, comprising: a steering wheel body including a covering surface to be essentially faced to a vehicle occupant in an installed position, and a lateral circumferential surface extending from said covering surface such that an interior space is defined by said covering surface and said lateral circumferential surface, said lateral circumferential surface defining an opening; and an airbag module insertable into said interior space through said opening.

This and other goals have also been achieved according to the invention by providing a method of manufacturing a vehicle steering wheel equipped with an airbag module, comprising the steps of: forming a steering wheel body including a covering surface to be essentially faced to a vehicle occupant in an installed position, and a lateral circumferential surface extending from said covering surface such that an interior space is defined by said covering surface and said lateral circumferential surface, said lateral circumferential surface defining an opening; and inserting an airbag module into said interior space through said opening.

According to the invention the steering wheel body has an opening at its circumferential surface, through which opening the airbag module can be inserted. This has the advantage that the airbag module does not have to be mounted on the vehicle steering wheel either from the front or from the rear. At the front, essentially facing the vehicle occupant, the plastic foam covering can then be designed as a permanent part of the steering wheel body so that the steering wheel design is not affected by the airbag device. At the rear, facing the steering shaft, the steering wheel body can be fastened directly to the steering shaft by means of the hub part, making it possible to replace the airbag module without removing the steering wheel.

According to certain preferred embodiments, the opening can be closed by a covering device. This has the advantage that the opening in the circumference of the steering wheel body can be concealed in simple fashion and the interior of the steering wheel body is protected against the penetration of dirt.

According to certain preferred embodiments, the airbag module and the steering wheel body have effective surfaces or devices that cooperate with one another in such fashion that the airbag module is guided as it is placed in the steering wheel body and/or that the airbag module is secured with locking in its end position in the steering wheel body. Thus a simple installation of the airbag module is advantageously guaranteed. The airbag module can be pushed through the opening into its end position, in a clearly defined manner, in which position it is automatically secured, and can be unlocked again for removal, possibly by using a special tool. It is also advantageous that the airbag module, under the influence of the effective surfaces, is always installed in the same position in the vehicle steering wheel, increasing both installation safety and functional reliability of the airbag device.

According to certain preferred embodiments, the airbag module and steering wheel body have a connecting device that fits together where the airbag module is introduced into the steering wheel body, thus creating the necessary electrical contacts between the airbag module and a control device. A connecting device that fits together automatically when the airbag module is slid into the steering wheel body has the advantage that no additional installation effort is required to produce the electrical contacts between the airbag module and the control device. In addition, assembly in conjunction with the effective surfaces between the airbag module and the steering wheel body can be accomplished simply and safely.

Other objects, advantages and novel features of the present invention will become apparent from the following detailed description of the invention when considered in conjunction with the accompanying drawings.

BRIEF DESCRIPTION OF THE DRAWINGS

The single FIGURE is a partially sectional view of the vehicle steering wheel mounted on the steering shaft with the airbag module installed, according to a preferred embodiment of the present invention.

DETAILED DESCRIPTION OF THE DRAWINGS

As shown in the single FIGURE, a steering shaft 1 is permanently attached to a hub part 2 of a steering wheel body 3. Steering wheel body 3 has an opening at its lateral circumferential surface 4, through which opening an airbag module 6 has been inserted. Opening 5 is sealed by a covering device 7 that is a part of the airbag module 6 and fits flush against the plastic foam covering 16 of steering wheel body 3 at its circumferential surface.

Steering wheel body 3 is covered with plastic foam, with the side of steering wheel body 3 facing a vehicle occupant, not shown, being a permanent part of the plastic foam covering 16 of steering wheel body 3. This part of plastic foam covering 16 of steering wheel body 3 has a tearing notch 8 which faces airbag module 6 and cannot be seen from the outside.

In addition, effective guiding surfaces 9 are provided in steering wheel body 3 and corresponding effective guiding surfaces 10 are provided on airbag module 6 which cooperate with one another when airbag module 6 is slid through opening 5 so that airbag module 6 can be inserted through opening 5 only when it is in a certain position, and is then guided up to the end position shown. In this end position, airbag module 6 is secured with locking by retaining elements 11.

With the guided insertion of airbag module 6 by effective surfaces 9 and 10, a plug element 12 on airbag module 6 and another plug element 13 in steering wheel body 3 fit together automatically. These two plug elements 12 and 13 are designed as contact rails of a connecting device, serving to provide the necessary electrical contacts between airbag module 6 and a control device, not shown.

Since the insertion of airbag module 6 through opening 5 takes place in the direction that does not guide any forces when the airbag is triggered, retaining elements 11 can be made very filigreed. They are only required to hold the airbag module 6 in its installed position and do not have to accept any forces when the bag is triggered. Because the side of the steering wheel body 3 formed by the plastic covering 16 of steering wheel body 3 and facing the vehicle occupant is so designed, it is possible to employ a wide variety of steering wheel designs equipped with a standard airbag module 6. Similar steering wheels can be equipped with different airbag modules 6 without this being visible to the eye. Tearing notch 8 is not located within the view of the vehicle occupant. This contributes to a homogeneous appearance.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A vehicle steering wheel to be equipped with an airbag module, comprising:

a steering wheel body that is at least partially covered with a plastic foam covering, said steering wheel body being designed to accept said airbag module, with a side of said steering wheel body that essentially faces a vehicle occupant in an installed position being a permanent part of said plastic foam covering, said steering wheel body being fastenable via a hub part to a steering shaft, said steering wheel body having an opening on a circumferential surface through which said airbag module can be inserted, wherein said opening can be closed by a covering device which is part of said airbag module.

2. A vehicle steering wheel according to claim 1, further comprising retaining elements which secure said airbag module in a locked position in said steering wheel body.

3. A vehicle steering wheel according to claim 1, wherein said airbag module and said steering wheel body each have a connecting device which, when said airbag module is inserted into said steering wheel body, fit together to produce electrical contacts between said airbag module and a control device.

4. A vehicle steering wheel according to claim 1, wherein said covering device fits flush with an adjacent area of said circumferential surface which defines said opening in said installed position.

* * * * *